United States Patent [19]

Anderson

[11] 4,279,151
[45] Jul. 21, 1981

[54] TEMPERATURE MEASURING SYSTEM
[75] Inventor: Jack A. Anderson, Porter, Ind.
[73] Assignee: Bethlehem Steel Corporation, Bethlehem, Pa.
[21] Appl. No.: 64,468
[22] Filed: Aug. 7, 1979
[51] Int. Cl.³ .............................................. G01K 7/04
[52] U.S. Cl. ............................................... 73/343 R
[58] Field of Search ................. 73/359 R, 359 A, 360, 73/361, 343 R

[56] References Cited
U.S. PATENT DOCUMENTS

| | | | |
|---|---|---|---|
| 3,478,808 | 11/1969 | Adams | 364/477 X |
| 3,671,953 | 6/1972 | Goldberg | 340/595 X |
| 3,921,453 | 11/1975 | Platzer, Jr. | 73/361 |
| 4,133,036 | 1/1979 | Watson | 73/359 R X |

Primary Examiner—Jerry W. Myracle
Attorney, Agent, or Firm—Joseph J. O'Keefe; Michael J. Delaney; George G. Dower

[57] ABSTRACT

In a continuous slab caster, for example, the system measures tundish molten steel temperature using tundish probe, recorder and temperature monitoring circuits having separate outputs to a temperature indicator and an industrial process controller. Monitoring circuits periodically reject errors and discontinuities in temperature traces, reject open thermocouple or burn-out conditions, and advise the probe operator by way of the indicator to accept a present good reading or take another sample. The last bonafide temperature reading is held at the output to the process controller, thereby eliminating control errors caused by errors or discontinuities in temperature traces.

13 Claims, 3 Drawing Figures

TEMPERATURE MEASURING SYSTEM

BACKGROUND OF THE INVENTION

1. Field of the Invention

This invention relates broadly to a temperature measuring system having means to detect and indicate both good and abnormal temperature traces and issue only the last good trace to an industrial process controller.

2. Description of the Prior Art

Many industrial processes require an accurate and continuously reliable temperature measurement of the starting material so that a satisfactory finished product may be manufactured. In the process of continuously casting steel slabs, for example, molten metal from a tundish is continuously introduced into a water-cooled mold where initial solidification takes place in the form of a frozen metal skin surrounding a liquid core as the cast product continuously leaves the mold. It is extremely important to have available at all times the tundish temperature, that is, the starting material temperature, in order that the proper caster speed and mold heat removal control may be effected to prevent a breakout in the skin below the mold.

Heretofore, tundish temperature measuring equipment consisted essentially of tundish temperature probe means and a temperature recorder having a retransmitting slidewire to provide a tundish temperature signal for use in a caster speed and mold heat removal controller. The probe means includes a detachably mounted inexpensive pole with a temperature sensor, such as a thermocouple, at its tip. The pole is insertable by an operator into the tundish molten metal during caster operation. Because of the tundish hostile environment at a temperatures ranging from 1204°–1760° C. (2200°–3200° F.), good electrical connections at the pole point of detachment are not always made or visible. Also, the sensor is subjected to both thermal and mechanical stresses which fatigue the sensor and cause a thermocouple to burn out. Consequently, at times the probe means temperature trace is subject to error and/or discontinuities and these abnormalities have a profound effect on casting machine control. Temperature trace abnormalities may cause unnecessary casting machine slowdown, or even shutdown, the latter having serious economic and safety consequences.

SUMMARY OF THE INVENTION

One of the objects of this invention is to provide an improved temperature measuring system which will overcome the foregoing difficulties.

Another object of this invention is to provide improvements in a temperature measuring system that may either be added to presently installed apparatus or provide in various new combinations of apparatus.

Still another object of this invention is to provide a temperature measuring system that will advise an operator of error and/or discontinuity in probe means temperature traces.

While another object of this invention is to provide a temperature measuring system that has probe means subject to erroneous and/or discontinuous temperature traces, yet will prevent a temperature control error in an industrial process dependent upon said system.

The foregoing objects are attainable by employing a temperature measuring system having probe means at times subject to error and/or discontinuous operation, means responsive to the probe means for determining material temperature and producing a temperature signal proportional thereto, temperature monitoring circuit means having separate indicator and control outputs to a temperature indicator and an industrial process controller, respectively, and utilization means including a temperature indicator. The monitoring circuit means includes timing, comparative and sample and hold circuits arranged to periodically reject errors and discontinuities in temperature traces, to reject open thermocouple or burned-out conditions, to advise an operator by way of the indicator to accept a present good reading or to take another sample, and to communicate to an industrial process controller a temperature control signal representing the last good temperature measurement to be made which may be the present one.

DESCRIPTION OF THE PREFERRED EMBODIMENT

Figure 1:
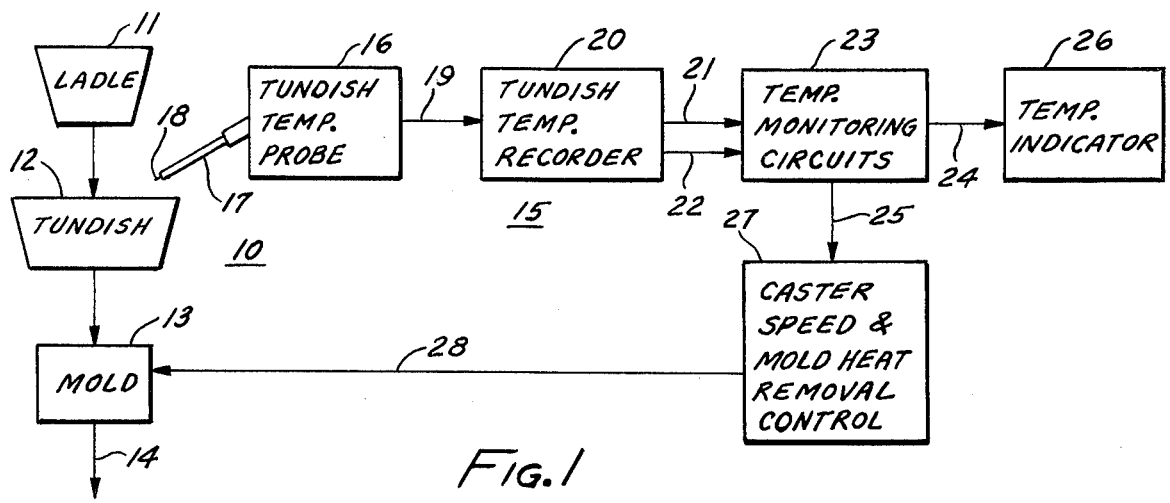
FIG. 1 is a block diagram of a continuous caster installation incorporating the present invention.

Referring to FIG. 1, there is shown a portion of a continuous caster 10 wherein the present invention is incorporated. Caster 10 has a ladle 11 of molten metal which is discharged into tundish 12 and then restored with a fresh supply of molten metal. In the meantime, molten metal from tundish 12 is continuously introduced into water-cooled mold 13 where initial solidification takes place in the form of a frozen metal skin around a liquid core as cast product 14 continuously leaves mold 13. As mentioned above, it is extremely important to have available at all times the tundish temperature so that proper casting speed and mold cooling may be established. For this reason, temperature measuring system 15 is provided which senses tundish temperature and outputs both indicator signals to a probe operator and control signals to caster 10 as will be explained below.

Temperature measuring system 15 includes tundish temperature probe 16 with detachably mounted pole 17 adapted to be inserted into tundish 12 by an operator so that sensor tip 18 will immerse in the tundish molten metal. Pole 17 is preferably a commercially available, expendable, device having, for example, a thermocouple at tip 18 for sensing molten metal that may range from 1204° to 1760° C.(2200°–3200° F.). Probe 16 output is fed over lead 19 to means responsive to the probe means for determining the tundish temperature and producing a temperature signal proportional thereto. For illustrative purposes, this means is a commercial strip chart recorder identified in FIG. 1 as tundish temperature recorder 20.

Temperature traces on recorder 20 vary with both good and abnormal temperature values. These of course are subject to error and/or discontinuities, including thermocouple burn-out, as appear at probe 16 output on lead 19. Recorder 20 has two outputs, namely, a temperature signal output on lead 21 and a control output on lead 22. The temperature output on lead 21 is developed from, for example, a retransmitting slidewire which produces a 0–10 VDC output proportional to the temperature range of 1204°–1760° C. (2200°–3200° F.). The control output on lead 22 is a low-high output from an internal switch contact set to close at 1204° C. (2200° F.) and above.

Temperature measuring system 15 also includes temperature monitoring circuits 23 which, in response to the tundish temperature recorder 20 temperature and control signals output on leads 21, 22, produce separate indicator and control signals output on leads 24, 25, respectively, to temperature indicator 26 and caster speed and mold heat removal control device 27. As will be explained below in FIGS. 2 and 3, the temperature monitoring circuits 23 including timing, comparative and sample and hold circuits arranged to periodically reject errors and discontinuities in temperature traces, to reject open thermocouple or burned-out conditions, to advise a probe 16 operator by way of indicator 26 to accept a present good tundish temperature reading or to take another sample, and to communicate to control device 27 a tundish temperature control signal representing the last good temperature measurement to be made which may be the present one.

Temperature indicator 26 is preferably a commercial digital device having a large numerical readout. Indicator 26 includes internal scaling and offset circuits adjusted such that without any signal on lead 24 it will read "zero" temperature. An indicator sample and hold circuit in device 23, and noted below, is biased and scaled such that 0–10 VDC applied at its input will produce either a good or abnormal 1204°–1760° C. (2200°–3200° F.) temperature signal at its output and on lead 24. This either good or abnormal reading will therefore appear on temperature indicator 26.

The last good control temperature signal output from temperature monitoring circuits 23 on lead 25 varies from 0–10 VDC and corresponds to a tundish temperature range of 1204°–1760° C. (2200°–3200° F.). Tundish temperature is a control parameter used in conventional caster speed and mold heat removal control device 27 to control caster 10 speed and/or mold heat removal. The last good tundish temperature control signal held at lead 25 is shown simply as a device 27 output on lead 28 which controls heat removal from mold 13. Caster 10 variable speed drive means is not shown.

Figure 2:
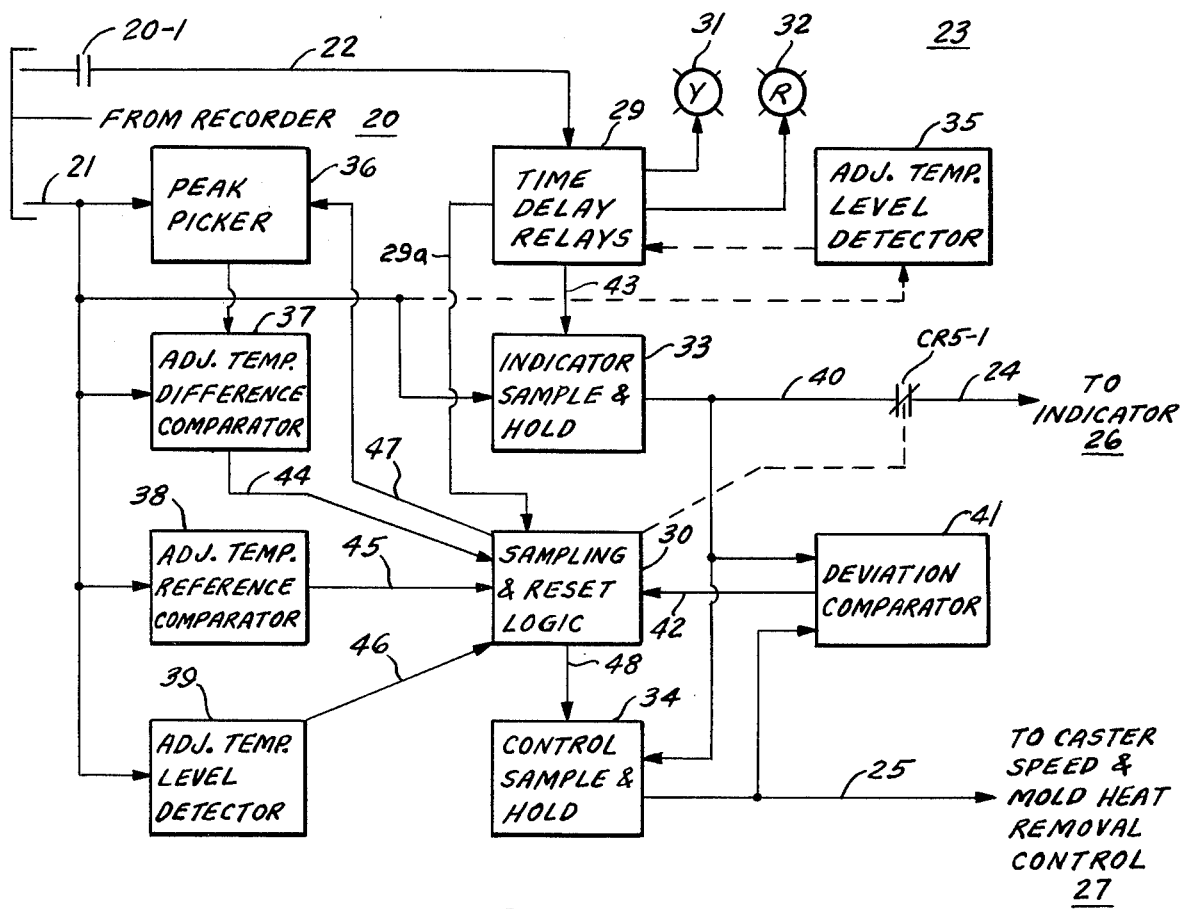
FIG. 2 is a block diagram of temperature sampling circuits used for monitoring purposes in the present invention.
Figure 3:
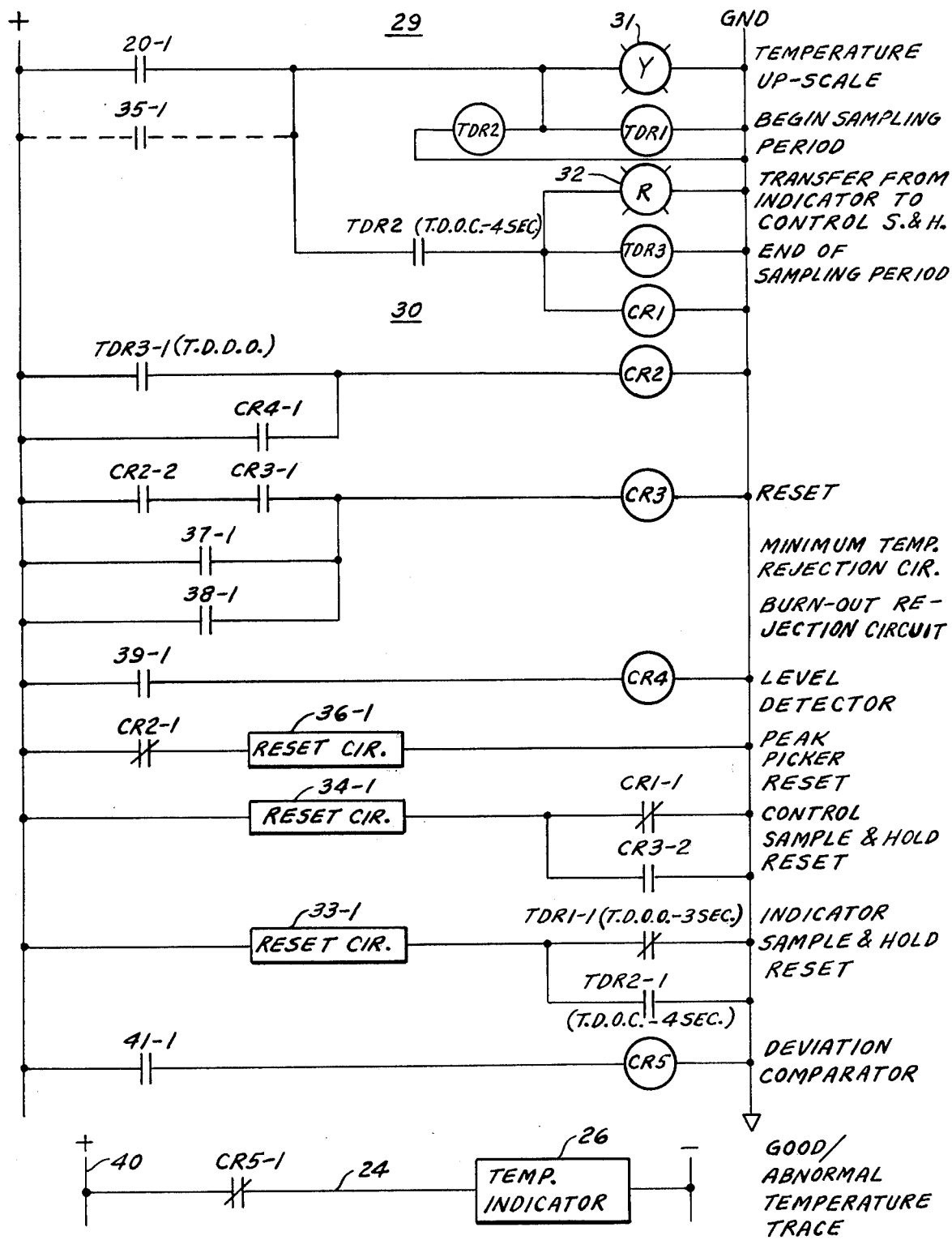
FIG. 3 is an elementary control diagram of timing, sampling and reset logic used in the temperature sampling circuits shown in FIG. 2.

Turning now to FIGS. 2 and 3, a description will be made of temperature monitoring circuits 23 wherein periodic sample and hold functions are performed at a preadjusted temperature spread of 555° C. (1000° F.), that is between 1204° and 1760° C. (2200°–3200° F.), during a preset sampling period of about 5 seconds. For convenience, temperature monitoring circuits 23 may be Foxboro SPEC200 analog computing elements having adjustable inputs and outputs each nominally preset at 0–10 VDC, except time delay relays and sampling and reset logic circuits which are conventional switching devices. All devices having a reset function will be assumed to be reset and ready to operate at the beginning of the sampling period, except a control sample and hold device which is presumed to hold the last good temperature measurement until the next good one occurs.

The sampling period is initiated by recorder contact 20-1 closure whenever tundish temperature equals and exceeds 1204° C. (2200° F.). Contact 20-1 closure energizes time delay relays 29 which establish a preset sampling period of 5 sec. on lead 29a in cooperation with sampling and reset logic 30. Contact 20-1 closure also energizes yellow pilot light 31, signifying to an operator that the tundish temperature is up-scale from 1204° C. (2200° F.). It also energizes time delay relay TDR1 in device 29 which determines the beginning of the sampling period. Time delay relay TDR1 has one normally-open contact TDR1-1 which has a delayed closing after about 4 sec.

Closure of TDR2-1 energizes red pilot light 32, time delay relay TDR3 in device 29 and control relay CR1 in device 30. Energizing red light 32 signifies to an operator that the temperature sampling period is complete. Energizing TDR3 signifies the end of the sampling period when its normally open contact TDR3-1 closes immediately and opens after a time delay of about 1 sec., thereby establishing the ending of the 5 sec. sampling period. Energizing control relay CR1 opens a normally closed contact CR1-1, one of two such parallel contacts in the control sample and hold reset circuit 34-1. Resetting of control sample and hold device 34 will be described below. When time delay relay contact TDR3-1 closed, it energized control relay CR2 in device 30 for about 1 sec., or for a different duration as determined by closure of normally open contact CR4-1, thereby ending the sampling period.

Instantaneous tundish temperature signal on lead 21 is fed, alternatively, to the input of adjustable temperature level detector 35, the latter having a relay contact 35-1 in its output which closes at about 1316° C. (2400° F.). Contact 35-1 may be substituted for recorder contact 20-1 to initiate the sampling period if a recorder contact 20-1 is not available.

Instantaneous tundish temperature signal on lead 21 is also fed, simultaneously, to the inputs of indicator sample and hold 33, peak picker 36, adjustable temperature difference comparator 37, adjustable temperature reference comparator 38 and adjustable temperature level detector 39. Each device 37, 38, 39 has a respective relay contact output 37-1, 38-1, 39-1 which is operatively associated with sampling and reset logic 30 as described below.

Indicator sample and hold 33 periodically follows the tundish temperature signal during its sampling mode. It holds an indicator output signal on lead 40 during its hold mode which corresponds to the instantaneous value of tundish temperature signal at the end of the sampling period. Device 33 has an analog output suitably scaled so that the indicator output signal on lead 40 will vary between 0 and 10 VDC for a tundish temperature range of 1204° to 1760° C. (2200°–3200° F.). In this manner, the indicator output signal passes through normally closed contact CR5-1, through lead 24, and to digital temperature indicator 26. Indicator sample and hold device 33 is reset at the end of the sampling period and will therefore present either a new good or abnormal tundish temperature signal to indicator 26 for updating purposes as determined by operator.

When indicator sample and hold 33 has completed sampling the tundish temperature signal at the end of a sampling period, the indicator output signal on lead 40 is fed to both indicator 26 and transferred to the input of control sample and hold 34. If the tundish temperature signal trace is acceptable, or in other words a good trace, then control sample and hold 35 will output a good control output signal on lead 25 to caster speed and mold heat removal control 27. If the tundish temperature trace is unacceptable or abnormal, then this temperature trace in itself during the instant sampling period and/or a reset action described below will cause rejection of the instant tundish temperature trace and cause control sample and hold 34 to hold the last good control output signal on lead 25.

A continuous test of tundish temperature signal rejection is made by deviation comparator 41 which compares the indicator output signal on lead 40 with the control output signal on lead 25. If deviation comparator 41 detects a difference greater than zero volts, an internal relay contact 41-1 closes signifying an instantaneous tundish temperature trace rejection on lead 42. Closure of contact 41-1 energizes control relay CR5 in device 30 which opens normally closed contact CR5-1 and causes zero volts to be input to digital temperature indicator 26. A zero temperature reading on indicator 26 advises the probe 16 operator to take another temperature sample. Resetting of indicator and control sample and hold devices 33, 34 will be described below.

Resetting of indicator sample and hold 33 occurs 3–4 sec. into the sampling period when time delay relay coils TDR1, TDR2 are energized by closure of recorder contact 20-1. This action in effect sends a signal from device 29, over lead 43, to device 33 to perform a reset function. Normally closed contact TDR1-1 opens after a 3 sec. delay to activate indicator sample and hold reset circuit 33-1. After about 4 sec., contact TDR2-1 closes to de-activate reset circuit 33-1.

There are two additional types of circuits featured in temperature monitoring circuits 23 which monitor the tundish temperature trace for errors and/or discontinuities. These are the minimum temperature rejection circuit and the thermocouple or other sensor, burn-out rejection circuit, both operating in a reset circuit which resets devices 34 and 36.

The temperature rejection circuit consists of peak picker 36 and adjustable temperature difference comparator 37 operating together with sampling and reset logic 30 to detect variations in tundish temperature trace on lead 21 during a sampling period. Such variations may be the result of poor or intermittent sensor or the thermocouple connections. Ordinarily these would cause control errors and instantaneous caster machine speed reductions that could have serious consequences. However, such consequences are prevented by the present invention. Peak picker 36 is activated during the sampling period and any difference between its output and that of the instantaneous recorder 20 output on lead 21 will activate the minimum temperature rejection circuit, depending upon the minimum temperature value preset into comparator 37.

A normally open contact 37-1 in comparator 37 closes when the minimum temperature rejection circuit is activated, thereby sending this signal over lead 44 to energize control relay CR3 operating in device 30 to reset control sample and hold 34. CR3 coil seals itself for the duration of the sampling period through CR3-1 contact closure and contact CR2-2 already closed when CR2 coil was energized as described above. Contact CR3-2 opens and causes control sample and hold 34 to activate its reset circuit 34-1 only when control relay contact CR1-1 was opened at the end of the sampling period as described above, thereby causing device 34 to restore its operation to the sampling mode. Otherwise, the last good control output signal will be held on lead 25.

The thermocouple, or sensor, burnout rejection circuit consists of adjustable temperature reference comparator 38 operating together with sampling and reset logic 30 to detect discontinuities in the tundish temperature trace on lead 21 during a sampling period. If an open sensor, or thermocouple, is detected during a sampling period, the new tundish temperature signal on lead 21 is rejected by presetting reference comparator 38 at a reference temperature of between 1593° to 1760° C. (2900°–3200° F.). When this condition is not met on lead 45, contact 38-1 closes in device 38 and it too will energize control relay coil CR3 in device 30 to perform the same reset function as described above when comparator 37 contact 37-1 closed. At this time, digital temperature indicator 26 now reads 1204° C. (2200° F.) which signifies to the probe 16 operator that a new sensor pole 17 must be installed. The sensor, or thermocouple, burn-out rejection circuit is deactivated or reset each time a new sensor, or thermocouple, is placed on tip 18 in tundish temperature probe 16.

The reset circuit consists of adjustable temperature level detector 39 cooperating with sampling and reset logic 30 to properly reset control sample and hold device 34 during the last 1 sec. at the end of a sampling period and peak picker 36 at the beginning of the sampling period. A normally open contact 39-1 in device 39 closes whenever the tundish temperature trace on lead 21 exceeds a preset value of about 1316° C. (2400° F.) in device 39 and signals this event over lead 46 to device 30. Contact 39-1 closure energizes control relay CR4 coil in device 30, thereby energizing control relay coil CR4 any time the tundish temperature trace exceeds 1316° C. (2400° F.).

When CR2 coil is energized by the closure of CR4-1 contact, normally closed contact CR2-1 opens and signals this event over lead 47 to peak picker 36 to activate reset circuit 36-1. At the end of the sampling period, reset circuit 36-1 is de-activated and allows peak picker 36 to perform its normal function during the next sampling period. In addition, contact CR2-2 closes and seals control relay CR3 coil whenever either contact 37-1 or 38-1 closes as described above.

Moreover, the control sample and hold 34 reset circuit 34-1 may be activated only when both CR3-2 contacts remain open and normally closed contacts CR1-1 are caused to open. This event is signalled from device 30 over lead 48 to device 34. Contacts CR3-2 will remain open when a good tundish temperature trace is present on lead 21, thereby allowing the control signal output to be fed to caster control device 27. Contacts CR3-2 close only when either the minimum temperature or burn-out rejection circuits are activated, thereby preventing the activation of reset circuit 34-1. Contacts CR1-1 are caused to open only during the last second of the 5 sec. sampling period when CR1 coil is energized momentarily by the closure of TDR2-1 contacts. Thus, when both contacts CR3-1 and CR1-1 are open signifying a good tundish temperature trace, reset circuit 34-1 is activated and control sample and hold 34 provides a new good control temperature signal on lead 25. Otherwise, when either contact CR3-2 or CR1-1 is closed, only the last good control temperature signal will be fed over lead 25 to caster control device 27.

I claim:

1. A temperature measuring system having temperature probe means which is at times subject to error or discontinuous operation and is insertable into heated material, and means responsive to the probe means for determining material temperature and producing a temperature signal proportional thereto, the improvement comprising:

(a) monitor circuit means for periodically sampling the temperature signal and periodically holding separate indicator and control temperature signal values at corresponding indicator and control outputs, the held indicator signal representing either present good or abnormal temperature measurements, the held control signal representing the last good temperature measurement to be made which may be the present one.

2. A temperature measuring system having temperature probe means which is at times subject to error or discontinuous operation and is insertable into heated material, the system comprising:
   (a) means responsive to the probe means for determining material temperature and producing a temperature signal proportional thereto; and
   (b) monitor circuit means for periodically sampling the temperature signal and periodically holding separate indicator and control temperature signal values at corresponding indicator and control outputs, the held indicator signal representing either present good or abnormal temperature measurements, the held control signal representing the last good temperature measurement to be made which may be the present one.

3. A temperature measuring system, comprising:
   (a) temperature probe means insertable into heated material which is at times subject to error or discontinuous operation;
   (b) means responsive to the probe means for determining material temperature and producing a temperature signal proportional thereto; and
   (c) monitor circuit means for periodically sampling the temperature signal and periodically holding separate indicator and control temperature signal values at corresponding indicator and control outputs, the held indicator signal representing either present good or abnormal temperature measurements, the held control signal representing the last good temperature measurement to be made which may be the present one.

4. The system of claims 1, 2 or 3 further comprising:
   (d) utilization means responsive to an output from the monitor circuit means to indicate material temperature.

5. The system of claims 1, 2 or 3 further comprising:
   (e) utilization means responsive to the monitor circuit means indicator and control outputs to separately indicate material temperature and to control a process as a function of material temperature.

6. The system of claim 1, 2 or 3 wherein the monitor circuit means comprises:
   1. separate indicator and control sample and hold circuit means, each receiving the temperature signal and producing said corresponding indicator and control temperature signals, and
   2. sampling and reset circuit means for establishing a sampling period and resetting at least the indicator sample and hold circuit means at the end of said sampling period.

7. The system of claim 6 wherein the monitor circuit means further includes: 3. minimum temperature rejection circuit means operative with the sampling and reset circuit means for rejecting temperature signals below a preset minimum value.

8. The system of claim 6 wherein the monitor circuit means further includes:
   4. sensor burn-out rejection circuit means operative with the sampling and reset circuit means for rejecting temperature signals having discontinuities.

9. The system of claim 6 wherein the monitor circuit means further includes:
   5. deviation comparator means for interrupting the temperature signal output when the indicator and control temperature signals differ by a predetermined amount.

10. The system of claim 6 wherein the monitor circuit means further includes:
    3. minimum temperature rejection circuit means operative with the sampling and reset circuit means for rejecting temperature signals below a preset minimum value, and
    4. sensor burn-out rejection circuit means operative with the sampling and reset circuit means for rejecting temperature signals having discontinuities.

11. The system of claim 6 wherein the monitor circuit means further includes:
    3. minimum temperature rejection circuit means operative with the sampling and reset circuit means for rejecting temperature signals below a preset minimum value,
    4. sensor burn-out rejection circuit means operative with the sampling and reset circuit means for rejecting temperature signals having discontinuities, and
    5. deviation comparator means for interrupting the temperature signal output when the indicator and control temperature signals differ by a predetermined amount.

12. The system of claims 1, 2 or 3 further comprising:
    (d) utilization means responsive to an output from the monitor circuit means to control a process as a function of the material temperature.

13. A tundish temperature measuring system, comprising:
    (a) temperature probe means periodically inserted by an operator into a tundish of molten metal which is at times subject to error or discontinuous operation;
    (b) means responsive to the probe means for determining molten metal temperature and producing a temperature signal proportional thereto;
    (c) monitor circuit means for periodically sampling the temperature signal and periodically holding separate indicator and control temperature signal values at corresponding indicator and control outputs, the held indicator signal representing either present good or abnormal molten metal temperature measurements, the held control signal representing the last good molten metal temperature measurement to be made which may be the present one; and
    (d) utilization means responsive to the monitor circuit means indicator and control outputs to separately indicate molten metal temperature to the operator and to control a process as a function of molten metal temperature.

* * * * *